United States Patent
Hamm et al.

(10) Patent No.: US 10,684,605 B2
(45) Date of Patent: Jun. 16, 2020

(54) CONTROL DEVICE WITH INTEGRATED OPTIMIZER

(71) Applicant: Siemens Aktiengesellschaft, Munich (DE)

(72) Inventors: Carsten Hamm, Erlangen (DE); Hartmut Linke, Erlangen (DE); Thomas Puchtler, Adelsdorf (DE); Gerald Reichl, Erlangen (DE); Elmar Schäfers, Fuerth (DE); Matthias Teuchert, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 669 days.

(21) Appl. No.: 14/488,645

(22) Filed: Sep. 17, 2014

(65) Prior Publication Data

US 2015/0094846 A1    Apr. 2, 2015

(30) Foreign Application Priority Data

Sep. 27, 2013   (EP) .................................... 13186462

(51) Int. Cl.
   *G05B 19/19*    (2006.01)
   *G05B 13/02*    (2006.01)
   (Continued)

(52) U.S. Cl.
   CPC .......... *G05B 19/195* (2013.01); *B25J 9/1664* (2013.01); *G05B 13/021* (2013.01);
   (Continued)

(58) Field of Classification Search
   CPC ............ G05B 19/195; G05B 19/40937; G05B 13/021; G05B 2219/40511;
   (Continued)

(56) References Cited

U.S. PATENT DOCUMENTS 5,930,142 A    7/1999   Schleicher et al.
6,505,084 B2 *  1/2003  Blumenstock ........ G06F 11/142
                                                       700/177
(Continued)

FOREIGN PATENT DOCUMENTS

CN    103538068 A    1/2014
CN    105538327 A    5/2016
(Continued)

OTHER PUBLICATIONS

EP Office Action for priority application EP 13186462.1 dated Mar. 14, 2014.
(Continued)

*Primary Examiner* — Michael J Huntley
(74) *Attorney, Agent, or Firm* — Harness, Dickey & Pierce, P.L.C.

(57) ABSTRACT

A control device for a machine, with at least one axis, is configured to accept first parameters and to render a first general technological problem as a first specific technological problem. The control device is configured to determine once in advance, for a sequence of values of a position or a temporal derivation of the position of the axis of the machine, a number of variables assigned to the respective value, to solve the first specific technological problem in an optimum way. The control device is configured to store the assigned variables in a memory and, after the storage of the assigned variables, is configured to accept a first execution command. Based upon the first execution command, it is configured to output the sequence of values to the axis and during output, is configured to activate the machine in accordance with the number of variables assigned to the respective value.

10 Claims, 4 Drawing Sheets

(51) Int. Cl.
*G05B 19/4093* (2006.01)
*B25J 9/16* (2006.01)

(52) U.S. Cl.
CPC .......... *G05B 19/40937* (2013.01); *G05B 2219/40511* (2013.01); *G05B 2219/49372* (2013.01); *G05B 2219/50047* (2013.01); *Y02P 90/265* (2015.11)

(58) Field of Classification Search
CPC .......... G05B 2219/49372; G05B 2219/50047; G05B 19/4061; B25J 9/1664; Y02P 90/265
See application file for complete search history.

(56) References Cited

U.S. PATENT DOCUMENTS

| | | | |
|---|---|---|---|
| 6,505,085 B1 | 1/2003 | Seering | |
| 2001/0013278 A1* | 8/2001 | Hayashi | B23Q 15/22 100/43 |
| 2001/0048857 A1* | 12/2001 | Koch | G05B 19/4061 409/132 |
| 2002/0119020 A1* | 8/2002 | Hobbs | B23C 3/00 409/132 |
| 2005/0071021 A1* | 3/2005 | Weinhofer | B25J 9/1664 700/63 |
| 2008/0180051 A1* | 7/2008 | Hishikawa | G05B 19/195 318/570 |
| 2009/0116921 A1 | 5/2009 | Naumann | |
| 2009/0212032 A1 | 8/2009 | Geisel | |
| 2010/0231157 A1 | 9/2010 | Hosokawa | |
| 2010/0313718 A1* | 12/2010 | Meidar | B23Q 1/012 82/122 |
| 2013/0013110 A1 | 1/2013 | Cortsen | |
| 2013/0338807 A1* | 12/2013 | De Schepper | G05B 19/4097 700/96 |
| 2014/0025194 A1* | 1/2014 | Koide | G05B 19/182 700/187 |
| 2015/0039122 A1* | 2/2015 | Barakchi Fard | G06F 17/5009 700/186 |
| 2016/0124981 A1* | 5/2016 | Jiang | G05B 19/4093 707/821 |

FOREIGN PATENT DOCUMENTS

| | | |
|---|---|---|
| DE | 102010010105 A1 | 9/2010 |
| EP | 2093002 A2 | 8/2009 |

OTHER PUBLICATIONS

EP Priority application EP 13186462.1, filed Sep. 27, 2013.
Chinese Office Action and English translation thereof dated Oct. 9, 2016.
Rule 71(3) Communication dated Nov. 7, 2019 in European Application No. 13186462.1.

* cited by examiner

CONTROL DEVICE WITH INTEGRATED OPTIMIZER

PRIORITY STATEMENT

The present application hereby claims priority under 35 U.S.C. § 119 to European patent application number EP 13186462.1 filed Sep. 27, 2013, the entire contents of which are hereby incorporated herein by reference.

FIELD

At least one embodiment of the present invention generally relates to a control device for a machine with at least one axis. In at least one embodiment, the control device is embodied such that it accepts first parameters,
on the basis of the first parameters, renders a first general technological problem in concrete terms as a first specific technological problem,
for a sequence of values of a position or a temporal derivation of the position of the axis of the machine, determines a number of variables assigned to the respective value, so that when the machine is activated by the control device, the first specific technological problem will be solved,
accepts a first execution command,
on the basis of the first execution command, outputs the sequence of values to the axis and
during output of the respective value, activates the machine in accordance with the number of variables assigned to the respective value.

At least one embodiment of the present invention further generally relates to a system program which comprises machine code which is able to be processed by a control device for a machine with at least one axis, wherein the processing of the machine code by the control device causes the control device to be embodied accordingly.

At least one embodiment of the present invention further generally relates to a control device for a machine with at least one axis, wherein the control device is programmed with such a computer program.

At least one embodiment of the present invention further generally relates to a machine with at least one axis and such a control device.

BACKGROUND

Control devices are generally known. With numerical controls it is known for example that the operator of the numerical control can parameterize simple contours such as so-called pockets for example themselves. Such parameterization in such a case will be accepted into the subprogram processed by the numerical control and taken into account during the processing of the subprogram.

In some instances, the pocket would correspond to a first general technological problem. Position and dimensions of the pocket correspond to the first parameters. As part of this method of operation the values of the axis are required position values. The assigned variables are the required position values of other axes. Furthermore the values of the variables assigned to the axes are determined during the processing of the subprogram.

Movements in control systems for position-controlled axes (motion control) are predetermined as a rule by specifying a defined geometry, i.e. a path to be traversed. The required values for the position-controlled axes are generated by the operator in the prior art such that the kinematics of the machine traverses the geometry defined by the operator. The required values as a rule are defined on a track parameter (the arc length) of the trajectory to be followed. For example with machine tools as a rule the motion of the TCP (tool center point) is defined, but not the motion of the individual machine axes. Conversion into the required position values of the individual machine axes will be undertaken by the control device.

In the area of motion controls the relationship between the position-controlled axes is defined as a rule in the form of cam disks. The disadvantage of this definition is often that the operator must specify the motion in a precision that, where it relates to the automation task to be achieved, is actually not required at all. Thus for example it is necessary in handling tasks to move an end element of a manipulator from A to B and in doing so to avoid collisions to bypass a problem contour. By contrast the precise path is irrelevant.

Similar problems occur with other technological situations. With a servo press the operator would like to specify the reshaping velocity and the stroke number (i.e. the number of iterations per second or per minute) for example but not a velocity over an angle. Such situations also arise with other technological problems in which the technological quantities required by the user cannot readily be converted into axis movements of the position-controlled axis.

An algorithm is already currently known for servo presses, by which, on the basis of predetermined technological parameters, an optimum control of the servo press can be determined. This algorithm is specifically designed for determining the optimum control of a servo press. It is executed off-line, i.e. outside the control device. The determined variables assigned to the required position values are stored in a file, which is then stored in the control device. Modification of the file by the operator of the control device is no longer possible.

Furthermore comparable problem definitions are also known in which the values of the axis are not position values, but velocity values or—in the individual case—acceleration values.

A control device for a machine with at least one axis is known from U.S. Pat. No. 6,505,085 B1, wherein the control device is embodied such that it accepts parameters and, on the basis of the parameters, renders a general technological problem in concrete terms as a specific technological problem. By solving an optimization problem the control device determines a number of control signals and the associated control times, so that, on activation of the machine by the control device, the specific technological problem will be solved in the optimum manner in accordance with an optimization criterion. The control device stores at least the control times in a memory. The control device outputs the control signals to the axis at the associated control times and controls the axis accordingly through the signals.

SUMMARY

At least one embodiment of the present invention creates options so that the control device itself can determine an optimum control of the technological problem on the basis of the corresponding variables.

At least one embodiment is directed to a control device. Advantageous embodiments of the inventive control device are the subject matter of dependent claims.

In accordance with at least one embodiment of the invention, a control device is embodied so that, on the basis of the first specific technological problem, it determines a first parameterization of an optimization problem, on the basis of the optimization problem parameterized with the first parameterization, it determines by way of an optimizer first groups of optimized quantities within the control device, it determines once in advance the variables assigned to the values on the basis of a first group of optimized quantities, so that, on activation of the machine by the control device, the first technological problem is solved in accordance with an optimization criterion in the optimum way, it stores the assigned variables in a memory while assigning them to the respective value and it accepts the first execution command only after the assigned variables have been stored.

A system program is further disclosed. In accordance with at least one embodiment of the invention, a system program of the type stated at the start is designed by the control device being embodied in accordance with at least one embodiment of the invention by its execution. The system program can especially be stored on a data medium in machine-readable form—for example in electronic form.

A control device is disclosed. In accordance with at least one embodiment of the invention, the control device is programmed with at least one embodiment of the inventive system program.

A machine is disclosed. In accordance with at least one embodiment of the invention, the control device of the machine is embodied in accordance with at least one embodiment of the invention.

BRIEF DESCRIPTION OF THE DRAWINGS

The characteristics, features and advantages of this invention described above, as well as the manner in which these are achieved, will be explained more clearly and comprehensively in conjunction with the following description of the example embodiments, which are explained in greater detail in conjunction with the drawings. In the drawings, in schematic diagrams.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In accordance with at least one embodiment of the invention, a control device is embodied so that, on the basis of the first specific technological problem, it determines a first parameterization of an optimization problem, on the basis of the optimization problem parameterized with the first parameterization, it determines by way of an optimizer first groups of optimized quantities within the control device, it determines once in advance the variables assigned to the values on the basis of a first group of optimized quantities, so that, on activation of the machine by the control device, the first technological problem is solved in accordance with an optimization criterion in the optimum way, it stores the assigned variables in a memory while assigning them to the respective value and it accepts the first execution command only after the assigned variables have been stored.

This makes it possible to parameterize (=render in concrete terms) the automation task (=the first technological problem) and determine the variables assigned to the values of the axis once in advance by way of the control device and have them stored, so that they are available at any time for later processes.

The first parameters and/or the first execution command can be pre-specified via a man-machine interface for example. As an alternative it is possible for the first parameters and/or the first execution command to be determined automatically and supplied to the control device from a working or processing process or as a result of changing boundary conditions.

In a possible embodiment of the present invention the number of variables assigned to the respective value is equal to 1 and the variable assigned to the respective value is a derivation of the value according to the location or the time. This embodiment can especially be applied to servo presses.

As an alternative it is possible for the values to be required position values of the axis and for the variables assigned to the respective required position value to include a respective required position value of a further position-controlled axis. In this case a track is defined by the required position values and the assigned variables. This embodiment can especially be applied to handling tasks and to cranes.

It is possible for the variables assigned to the respective required position value to include a velocity or an acceleration. In this case not only a track to be traversed is specified, but in addition also a velocity or an acceleration with which the track is to be traversed. The velocity or the acceleration can be related if required to the—in this case position-controlled—axis, to one of the further position-controlled axes or to a track parameter.

It is possible for the values of the axis to be predetermined as fixed values or to be predetermined from outside—by an operator for example. As an alternative it is possible for the control device to determine the values to which the number of variables is assigned in each case, as part of solving the optimization problem. The method adopted depends on the general technological problem to be solved.

On the basis of this division a universal optimizer known per se can be used. It is merely necessary to formulate the first specific technological problem such that corresponding parameters of the first specific technological problem can be used as input variables of the optimizer. The output variables of the optimizer, i.e. the first groups of optimized values, can then be converted 1:1 into a number of variables assigned to the respective value in each case—if necessary including the determination of the respective value.

The last-mentioned embodiment, i.e. the use of the universal optimizer implemented within the control device, is especially of advantage when the control device is embodied such that it accepts second parameters,
on the basis of the second parameters, renders in concrete terms a second general technological problem which is of a different type to the first general technological problem as a second specific technological problem,
while solving an optimization problem, for a sequence of values of the axis of the machine, determines a number of the variables assigned to the respective value, so that, on activation of the machine by the control device, the second specific technological problem will be solved in the optimum way in accordance with an optimization criterion,
stores the assigned variables in a memory while assigning them to the respective value and
after the storage of the assigned variables, accepts a second execution command,
on the basis of the second execution command, it outputs the sequence of values to the axis—when outputting the respective value it activates the machine in accordance with the number of variables assigned to the respective value,
on the basis of the second specific technological problem it determines a second parameterization of the optimization problem,
on the basis of the optimization problem parameterized with the second parameterization it determines within the control device second groups of optimized quantities determined by way of the optimizer and
on the basis of a second group of optimized quantities in each case, it determines a number of variables assigned to the respective value in each case.

The second parameters and/or the second execution command can be pre-specified for example via the man-machine interface already mentioned. As an alternative it is likewise possible for the second parameters and/or the second execution command to be defined automatically for the control device from a working or processing process or as a result of changing boundary conditions and be supplied to the control device.

Through this embodiment it is especially possible, for a number of general technological problems of different types, to make available, for example via a man-machine interface, an input mask or the like in each case for the input of the respective parameters, to determine on the basis of the respective specific technological problem the respective parameterization of the optimization problem and to convert the groups of optimized quantities determined by the optimizer into the number of variables assigned to the respective value. However one and the same optimizer can be used for all such technological problems.

In an embodiment of the control device there is provision for it to accept the optimization criterion. This makes an optimization in different respects—depending on optimization criterion—possible.

A system program is further disclosed. In accordance with at least one embodiment of the invention, a system program of the type stated at the start is designed by the control device being embodied in accordance with at least one embodiment of the invention by its execution. The system program can especially be stored on a data medium in machine-readable form—for example in electronic form.

A control device is disclosed. In accordance with at least one embodiment of the invention, the control device is programmed with at least one embodiment of the inventive system program.

A machine is disclosed. In accordance with at least one embodiment of the invention, the control device of the machine is embodied in accordance with at least one embodiment of the invention.

Figure 1:
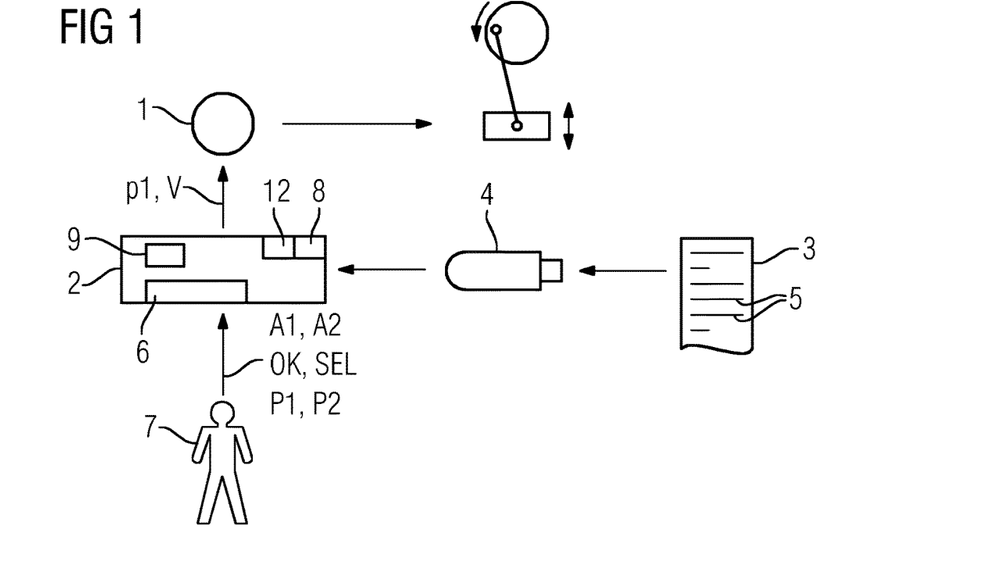
FIG. 1 shows a machine with a position-controlled axis.

In accordance with FIG. 1 a machine has an axis 1. In the embodiment of FIG. 1 the axis 1 is the sole axis. Furthermore the machine of FIG. 1 involves a working machine. As an alternative it could involve a processing machine. The axis 1 is position-controlled in the example embodiment of FIG. 1. As an alternative the axis 1 could however likewise be velocity-controlled or (in individual cases) acceleration-controlled. The machine can also be embodied as another type of machine.

The machine further has a control device 2. The control device 2 is generally embodied as a numerical control or as a motion control. The control device 2 is programmed with a system program 3. The system program 3 can for example be stored on a data medium 4 in machine-readable form (especially in electronic form) and be supplied to the control device 2 by connecting the data medium 4 to the control device 2. Purely by way of example the data medium 4 is shown in FIG. 1 embodied as a USB memory stick. This presentation is however purely by way of example and not to be understood as restrictive. Furthermore other types of programming of the control device 2 are also possible, for example via a link to a data network.

The system program 3 comprises machine code 5, which is able to be processed by the control device 2. The machine code 5 can be able to be processed by the control device 2 directly and immediately. In this case the machine code 5 consists directly of machine commands. As an alternative the machine code 5 can involve a mnemonic notation which is converted into machine commands by the control device 2 by interpretation. As an alternative or in addition a prior processing of the machine code 5 can be necessary, for example a decryption. Regardless of which method of operation is adopted, the control device 2 can however execute the machine code 5 without human intellectual activity having to be involved. The processing of the machine code 5 by the control device 2 causes the control device 2 to be embodied and to operate in the way described in greater detail in conjunction with FIGS. 2 and 3.

Figure 2:
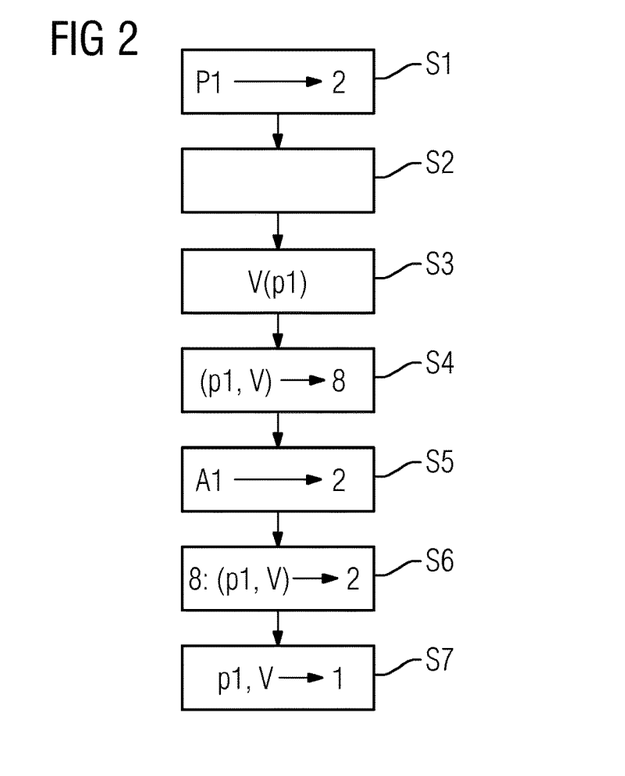
FIG. 2 shows a flow diagram.

In accordance with FIG. 2 the control device 2 (in a step S1—via a man-machine interface 6 for example (see FIG. 1)), accepts first parameters P1 from an operator 7. By way of the first parameters P1, in a step S2 a first general technological problem is able to be rendered in concrete terms by the control device 2 as a first specific technological problem. For example in accordance with FIG. 3, for a servo press indicated schematically in FIG. 1, for which the position-controlled axis 1 acts via an eccentric and a connecting rod on a press stamp, a velocity of the press stamp will be predetermined as a function of the stroke height of the press stamp. The first concrete technical problem in this—purely example—case, is the curve of the velocity of the press stamp as a function of the stroke height of the press stamp. The extent of eccentricity of the eccentric, a limit setting at which the press stamp opens and closes the press and also the velocity of the press stamp for specific stroke height of the press stamp are considered as first parameters P1. For corresponding general technological problems in other situations other first parameters P1 would naturally be considered.

In a step S3 the control device 2 determines while solving an optimization problem for a sequence of required position values p1 of the position controlled axis 1—generally: for a sequence of values of the position p1 or a temporal derivation of the position p1 of the axis 1—a number of variables V assigned to the respective required position value p1. In the example according to FIG. 1, in which a single axis 1 is present, for each value p1 only a single variable V is determined in each case. The assigned variables V are determined such that, on activation of the machine by the control device 2, the first specific technological problem—i.e. the predetermined curve of the velocity of the press stamp as a function of the stroke height for example—is solved in accordance with an optimization criterion OK in the optimum manner.

In a step S4 the control device 2 stores the assigned variables V while assigning them to the respective required position value p1 at a storage location. For example the control device 2 can store the assigned variables V in a first file 8. The storage can be remanent. In this case the variables are stored such that the stored data p1, V or the first file 8 as a whole are retained even if the energy supply of the control device 2 is interrupted, for example because the control device 2 is switched off. In any event however the storage is undertaken such that the stored data p1, V can be repeatedly retrieved and executed.

After the storage of the assigned variables V the control device 2, in a step S5, accepts a first execution command A1—for example from operator 7. A period of time, which lies between the storage of the assigned variables V and the acceptance of the first execution command A1, can be as required. It can be just a few seconds. It can also be hours, days or weeks or even more. The only decisive factor is that the control device 2 first fully determines the variables V and stores them and only then accepts the first execution command A1.

On the basis of the first execution command A1 the control device 2, in a step S6, reads out the stored assigned variables V. Furthermore the control device 2, in a step S7, outputs the sequence of values p1—in the present case of required position values p1—to the axis 1. The control device 2, as part of step S7, on output of the respective value p1, also activates the machine in accordance with the variables V assigned to the respective value p1. Depending on the specification by the operator 7, it is possible for example for the sequence of values p1 and the assigned variables V

- to be output only once,
- to be output until a predetermined number of iterations is processed, or
- to be output until the operator 7 or another device specifies an abort command.

Regardless of whether the values are only output once or are output multiple times, the data p1, V stored at the memory location is retained. It is thus also available for later calls.

Figure 3:
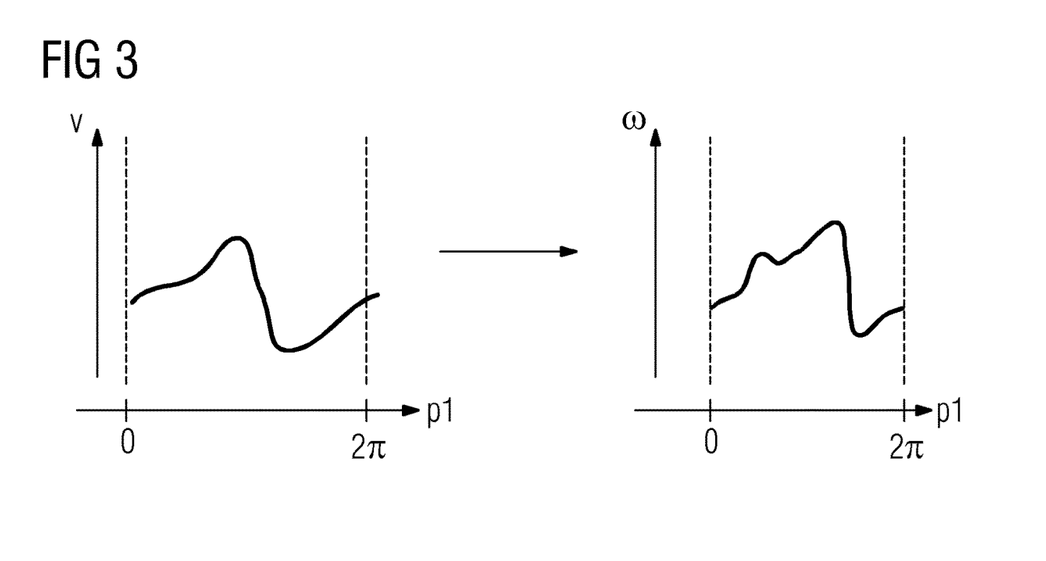
FIG. 3 shows a conversion of a first technological problem into variables assigned to required position values.

In the above example explained in conjunction with FIGS. 1 to 3, the number of variables V assigned to the respective value p1 is equal to 1. Furthermore the variable V assigned to the respective value p1 is a derivation of the value p1 according to the location or the time, in accordance with FIG. 3 in concrete terms according to the time. In accordance with FIG. 3 it is the (angular) velocity $\omega$. It could however—depending on the technological problem—also be assigned another variable. A few of these types of technological problems are briefly explained below—purely by way of example.

In an injection-molding process—in which the plasticized material is injected discontinuously into the injection mold—the axis 1 can for example cause a piston lift. In this case the axis 1 can be position-controlled by the values p1. A temperature, a heating power, a velocity of injection and/or an injection pressure are considered as assigned variables V for example.

With extrusion presses—in which extrusion is a continuous process—the axis 1 can for example bring about an advance of material. In this case the axis 1 can be velocity-controlled or rpm-controlled. The values p1 are in this case the first temporal derivation of the position of the axis 1. Similarly to injection molding, a temperature, a heating power and/or an injection pressure are considered for example as assigned variables V.

With systems capable of oscillation, vibration absorbers are often used. In this case the axis 1 can be acceleration-controlled. A force to be applied is considered as assigned variable V for example.

It is possible for the values p1 to be defined in advance or to be known to the control device 2 in another way. In this case it is actually possible, but not necessary, to also store the values p1 themselves in addition to the assigned variables V. The assignment of the variables V to the values p1 is produced in this case directly from the sequence of the assigned variables V. As an alternative it is possible for the values p1 to be predetermined for the control device 2 from outside—for example by the operator 7. In this case the values p1 do not actually have to be determined by the control device 2, however they must be stored together with the assigned variables V. As a further alternative it is possible for the control device 2 to determine the values p1, to which it assigns the assigned variables V in each case, as part of solving the optimization problem.

Figure 4:
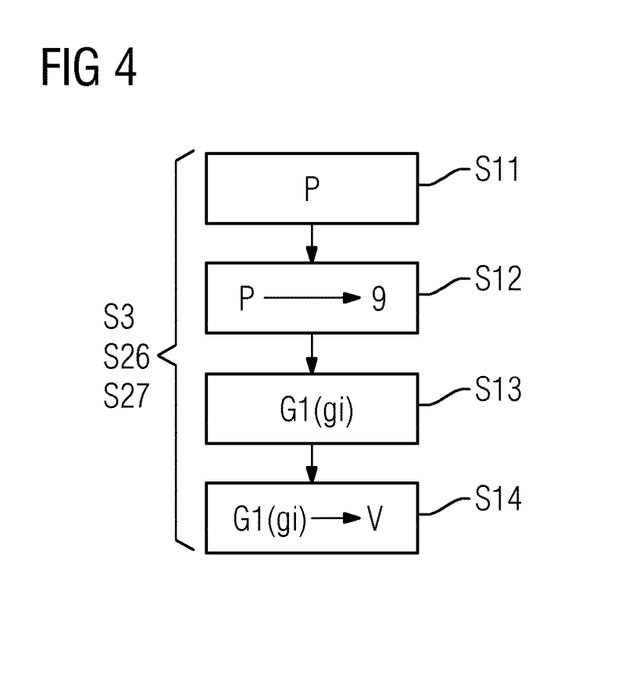
FIG. 4 shows a flow diagram.

To solve the optimization problem the control device 2 in accordance with FIG. 4 preferably initially specifies, in a step S11, on the basis of the first specific technological problem a first parameterization P of the optimization problem. The first parameterization can for example in relation to a predefined equation system with differential equations and/or algebraic equations with or without equality and/or inequality conditions to be adhered to, comprise the definition of boundary and start conditions. Other embodiments are also possible however.

The control device 2, in a step S12, specifies the first parameterization to an optimizer 9, which is implemented in accordance with FIG. 1 within the control device 2. Suitable optimizers 9 are known to persons skilled in the art as such. Then the control device 2 starts the optimizer 9. On the basis of the optimization problem parameterized with the first parameterization, the control device 2 determines by way of the optimizer 9 in a step S13 first groups G1 of optimized quantities gi. On the basis of a first group G1 of optimized quantities gi in each case, the control device 2 then, in a step S14, determines a number (1) of the variables V assigned to the respective value p1.

As part of the determination of the optimized quantities gi the control device 2 takes account of the optimization criterion OK. It is possible for the optimization criterion OK to be a fixed criterion predetermined to the control device 2. Preferably the optimization criterion OK can be predetermined to the control device 2 however in accordance with FIG. 1.

Figure 5:
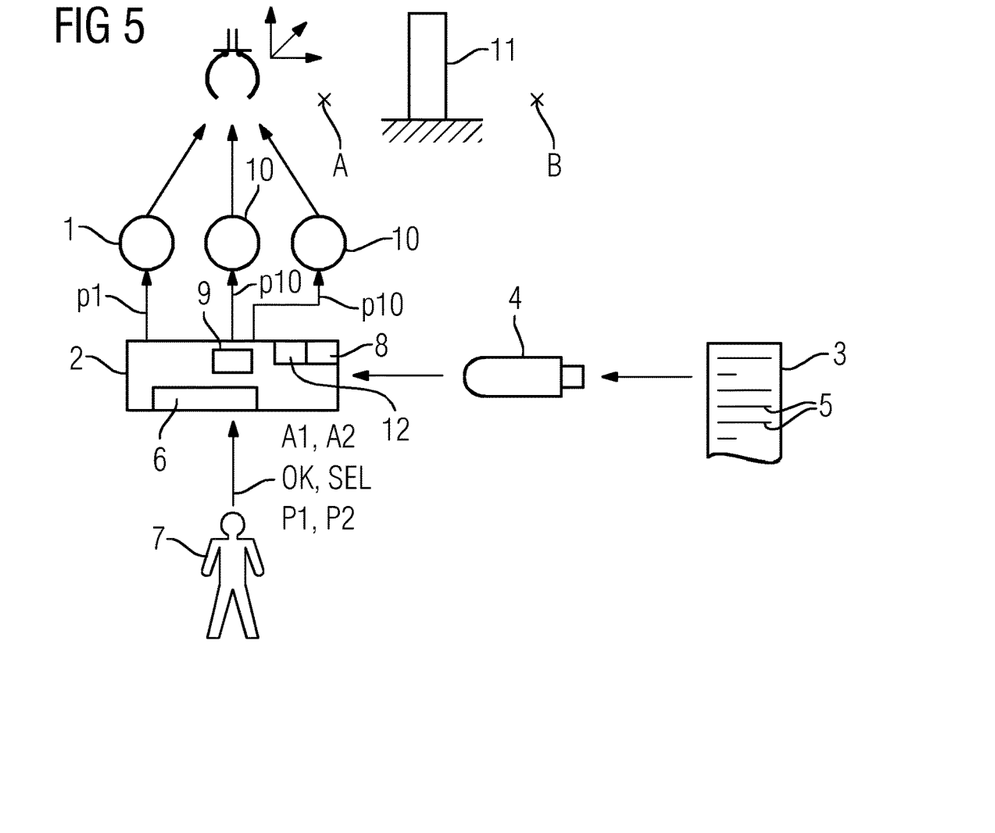
FIG. 5 shows a further machine with a position-controlled axis.

The embodiment of the machine in accordance with FIG. 5 corresponds in large areas with that of FIG. 1. The methods of operation described above in conjunction with FIGS. 1 to 4 are therefore also valid for the embodiment of the machine in accordance with FIG. 5, unless stated otherwise below.

Figure 6:
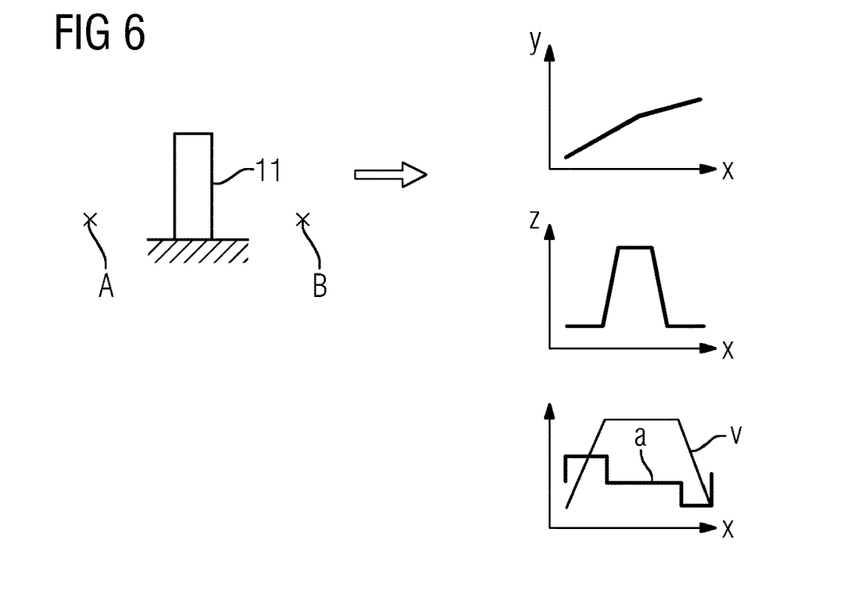
FIG. 6 shows a conversion of a second technological problem into variables assigned to required position values.

In the embodiment of the machine in accordance with FIG. 5, at least one further axis 10 is present in addition to the axis 1, for example two or three further axes 10. Mostly the axes 1, 10 are position-controlled. Similar to the embodiment of FIG. 1 the machine from FIG. 5 involves a working machine. As an alternative it could also involve a processing machine, a machine tool or an industrial robot. The first concrete technical problem can in this—likewise purely example—case according to FIG. 5 be the determination of a path to be traversed for predetermined start position A and predetermined end position B, wherein, as part of determining the path, boundary conditions such as for example an obstacle 11 are to be taken into account and a time—or energy-optimum device of travel is to be determined. FIG. 6 shows—purely by way of example—a conceivable solution of the optimization problem for a total of three axes 1, 10 acting translationally, wherein the axis 1 acts on the x-coordinate, the axes 10 on the y- and z-coordinates.

If the number of axes 1, 10 is to be activated by way of the control device 2—as is the case according to FIG. 5, the variables V assigned to the respective value p1—i.e. the values p1 for the axis 1—include for each further axis 10 its respective value p10. In addition the variables V assigned to the respective value p1, in accordance with the diagram shown in FIG. 6, can—but do not have to—include a velocity v or an acceleration a. The velocity v or the acceleration a can be related as required to the axis 1, to one of the further axes 10 or to another parameter, for example to a resulting track.

It has been explained above on the basis of two examples how, by an embodiment of the present invention, by solving an optimization problem, the assigned variables V can be determined. The present invention is not however restricted to these two technological problems but can readily be applied to other technological problems too.

Figure 7:
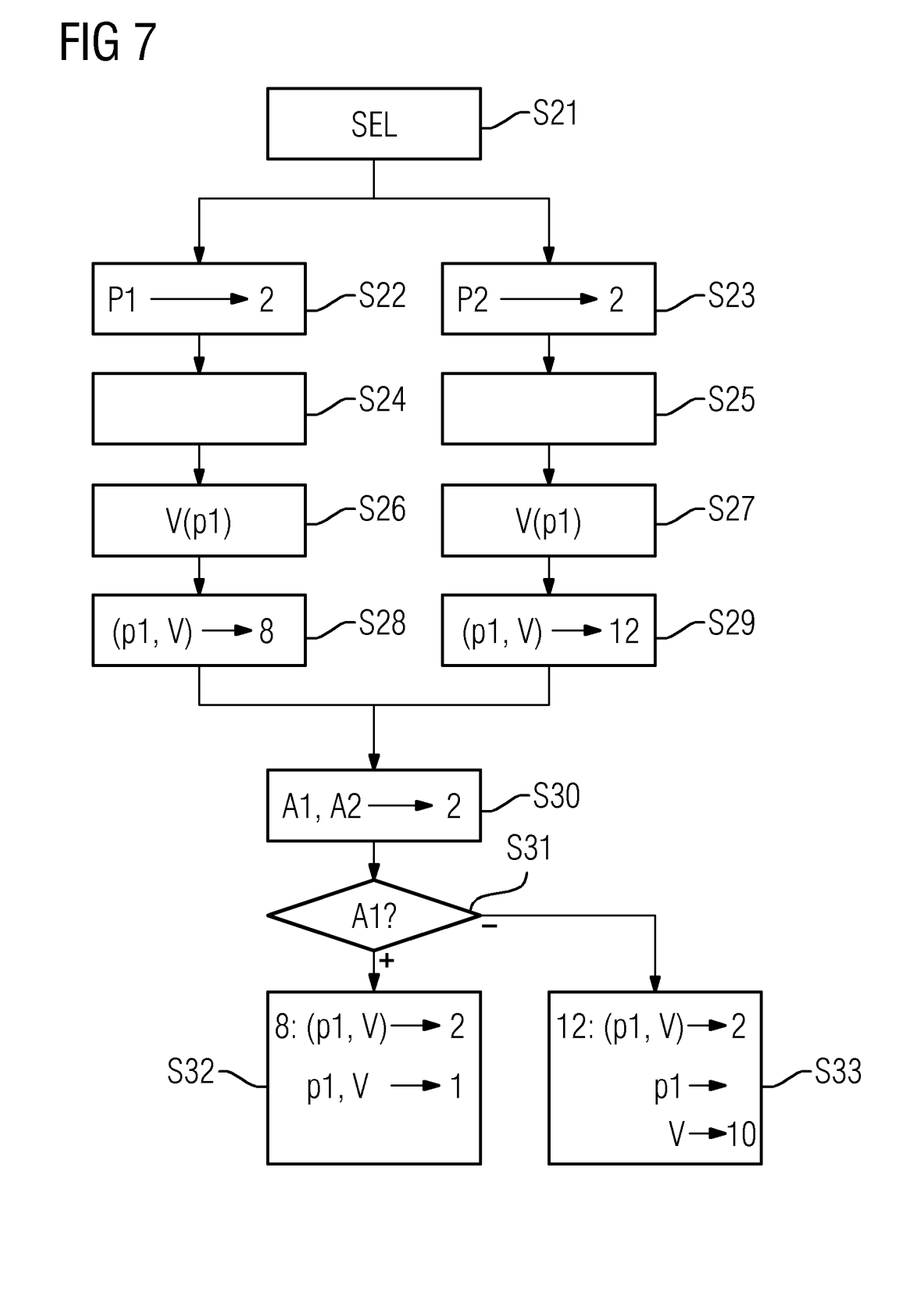
FIG. 7 shows a flow diagram.

It is further possible to embody the control device 2 as a result of its programming with the system program 3 such that not only a single but a number of general technological problems can be optimized through the control device 2, wherein the technological problems can be of different types from one another. For example it can be possible, based on the programming of the control device 2 with the system program 3, for the control device 2 in accordance with FIG. 7 to be initially predetermined by way of a selection command SEL, as to which of the at least two general technological problems the control device 2 should solve in practical form. In this case the control device 2, after accepting the selection command SEL (FIG. 7, step S21), depending on the value of the selection command SEL for example, accepts the first parameters P1 for a first general technological problem (step S22) or second parameters P2 for a second general technological problem (step S23). The first technological problem can for example be the technological problem explained above in conjunction with FIGS. 1 to 3, the second technological problem can be the technological problem explained above in conjunction with FIGS. 5 and 6. Other technological problems are possible however. Examples of such other technological problems have already been explained in conjunction with FIG. 1.

The principal method of operation for optimized solution is the same in both cases. In particular—see in FIG. 7 the two steps S24 and S25—the control device 2 renders in concrete terms the respective general technological problem on the basis of the respective predetermined parameters P1, P2 as a respective specific technological problem. Furthermore the control device 2—see the two steps S26 and S27 in FIG. 7—determines in each case a sequence of values p1 of the axis 1 of the—if necessary respective—machine, a number of variables V assigned to the respective value p1 in each case. The values are determined in both cases by solving an optimization problem such that, on activation of the—possibly respective—machine by the control device 2, the respective specific technological problem is solved in accordance with the optimization criterion OK in the optimum way. Furthermore—see the two steps S28 and S29 in FIG. 7—the assigned variables V determined in each case are stored while being assigned to the respective value p1. The variables can be stored for example in accordance with the diagram in FIG. 1 in a respective file 8, 12.

After the storage the control device 2, in a step S30, accepts an execution command A1, A2. In a step S31 the control device 2 checks which execution command A1, A2 was involved. Depending on the result of the check of step S31 the control device 2 moves to a step S32 or to a step S33. If the first execution command A1 was predetermined, in step S32, the control device 2 reads out the assigned variables V determined and stored in relation to the first technological problem, outputs the sequence of values p1 to the axis 1 and controls the machine on the output of the respective value p1 in accordance with the number of the variables V assigned to the respective value p1. If the second execution command A2 was predetermined, the control device 2, in step S33, reads out the assigned variables V determined and stored in relation to the second technological problem, outputs the sequence of values p1 to the axis 1 and on the output of the respective value p1, controls the machine in accordance with the number of variables V assigned to the respective value p1.

In this context it represents a significant advantage if, as part of the two steps S26 and S27 basically the same method of operation is adopted, namely that the control device 2—see FIG. 4—on the basis of the respective specific technological problem, determines a respective parameterization of the optimization problem, on the basis of the optimization problem parameterized with the respective parameterization determines within the control device 2 by way of the optimizer 9 respective groups G1, G2 of optimized quantities gi and on the basis of a respective group G1, G2 of optimized quantities gi in each case, determines a number of variables V assigned to the respective value p1 in each case.

The step S13 in particular is thus identically the same in any event—i.e. independently of which specific technological problem is to be optimized. Thus one and the same optimizer 9 can be used for solving different types of technological problem.

The method of operation explained above for two different types of technological problems is readily able to be expanded to three, four, five . . . different types of technological problems.

The embodiments of the present invention have many advantages. This already applies to the determination of the assigned variables V and their storage as such. To an even greater extent this applies to the use of a universal optimizer 9. This is because it is possible to determine an optimum solution for a plurality of technological problems in each case with one and the same optimizer 9. It is merely necessary, on the basis of the respective concrete technological problem, to perform the parameterization of the optimizer 9 and then implement its solution in the determination of the assigned variables V and possibly also of the values p1. Through this method of operation the control device 2 of the optimizer 9 can especially be encapsulated by the manufacturer of the control device and an interface and merely made available via which the optimizer 9 can accept a concrete parameterization and return optimized quantities gi.

In summary, at leat one embodiment of the present invention thus relates to the following subject matter:

A control device 2 for a machine with at least one axis 1 accepts first parameters P1. On the basis of the first parameters P1, the control device 2 renders in concrete terms a first general technological problem as a first specific technological problem. While solving an optimization problem, the control device 2 determines once in advance, for a sequence of values p1, a position or a temporal derivation of the position of the axis 1 of the machine, a number of variables V assigned to the respective value p1, so that on activation of the working machine by the control device 2 the first specific technological problem will be solved in an optimum way in accordance with an optimization criterion OK. The assigned variables V are stored by the control device 2 in a memory while being assigned to the respective value p1. The control device 2, after the storage of the assigned variables V, accepts a first execution command A1. On the basis of the first execution command A1, it outputs the sequence of values p1 to the axis 1. During output of the respective value p1 the control device 2 activates the machine in accordance with the number of variables V assigned to the respective value p1.

Although the invention has been illustrated in greater detail and described by the preferred example embodiments, the invention is not restricted by the disclosed examples and other variations can be derived there from by the person skilled in the art, without departing from the scope of protection of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Although the invention has been illustrated and described in greater detail by the preferred example embodiment, the invention is not restricted by the disclosed examples and other variations can be derived therefrom by the person skilled in the art, without departing from the scope of protection of the invention.

What is claimed is:

1. A control device for a machine with one or more axes, the control device being programmed with a system program comprising machine code stored on a non-transitory storage medium in machine-readable form, the control device being configured to execute the system program to:
    determine or accept first parameters via a man-machine interface;
    render, based on the first parameters, a first general technological problem in concrete terms as a first specific technological problem associated with determining a path of an axis, among the one or more axes, to be traversed from a start position to an end position, the first specific technological problem including a curve of a velocity of a press stamp as a function of a stroke height of the press stamp;
    determine a first parameterization of an optimization problem based on the first specific technological problem;
    determine, based on the optimization problem parameterized with the first parameterization, first groups of optimized quantities for a sequence of required position values or a temporal derivation of the required position values of the axis via an optimizer within the control device that takes into account an optimization criterion;
    convert a first group of optimized quantities, in each respective case, into one or more variables assigned to a respective required position value once in advance, so that when the machine is activated by the control device, the first specific technological problem is solved in an optimum manner in accordance with the optimization criterion, wherein
        the control device is configured to determine the respective required position value to which the one or more variables will be assigned, in each respective case, as part of solving the optimization problem,
        the one or more variables assigned to the respective required position value of the axis comprise at least a respective required position value of one or more other axes of the machine and an angular velocity related to the axis, and
        the path is defined by the sequence of required position values and the one or more variables depending on the optimization criterion;
    store the assigned one or more variables in a memory in association with the respective required position value in a file;
    accept, after storage of the assigned one or more variables, a first execution command from an operator of the machine;
    read, based on the first execution command, the assigned one or more variables from the memory;
    output, based on the first execution command, the sequence of required position values to the axis; and
    activate, during output of the respective required position value, the machine in accordance with the one or more variables assigned to the respective required position value,
    wherein, depending on a specification by the operator, output of the sequence of required position values and the assigned one or more variables is performed (i) only once, (ii) multiple times until a certain number of iterations are processed, or (iii) until the operator or another device specifies an abort command.

2. The control device of claim 1, wherein the one or more variables assigned to the respective required position value includes a derivation of the respective required position value according to location or time.

3. The control device of claim 2, wherein the control device is configured to:
    determine or accept second parameters,
    render, based on the second parameters, a second general technological problem, of a different type to the first general technological problem, in concrete terms as a second specific technological problem,
    determine, based on the second specific technological problem, a second parameterization of a second optimization problem,
    determine, while solving the second optimization problem parameterized with the second parameterization within the control device via the optimizer, second groups of optimized quantities for a sequence of values of the axis of the machine,
    convert a second group of optimized quantities, in each respective case, into a number of variables assigned to a respective value, so that during activation of the machine by the control device, the second specific technological problem will be solved in an optimum manner in accordance with a second optimization criterion,
    store the assigned variables in a memory while assigning them to the respective value,
    accept, after storage of the assigned variables, a second execution command,
    output, based on the second execution command, the sequence of values to the axis, and
    activate, during output of the respective value, the machine in accordance with the number of variables assigned to the respective value.

4. The control device of claim 2, wherein the control device is configured to accept the optimization criterion from outside, via the operator of the machine.

5. The control device of claim 1, wherein the control device is configured to:
    determine or accept second parameters,
    render, based on the second parameters, a second general technological problem, of a different type to the first general technological problem, in concrete terms as a second specific technological problem, determine, based on the second specific technological problem, a second parameterization of a second optimization problem, determine, while solving the second optimization problem parameterized with the second parameterization within the control device via the optimizer, second groups of optimized quantities for a sequence of values of the axis of the machine, convert a second group of optimized quantities, in each respective case, into a number of variables assigned to a respective value, so that during activation of the machine by the control device, the second specific technological problem will be solved in an optimum manner in accordance with a second optimization criterion, store the assigned variables in a memory while assigning them to the respective value, accept, after storage of the assigned variables, a second execution command, output, based on the second execution command, the sequence of values to the axis, and activate, during output of the respective value, the machine in accordance with the number of variables assigned to the respective value.

6. The control device of claim 1, wherein the control device is configured to accept the optimization criterion from outside, via the operator of the machine.

7. A machine comprising one or more axes and the control device of claim 1.

8. The control device of claim 1, wherein
the first parameterization defines at least boundary conditions associated with one or more obstacles to be avoided when traversing the path,
the one or more variables assigned to the respective required position value of the axis further include a velocity or an acceleration related to the axis or one of the one or more other axes,
the path is a time-optimal path or an energy-optimal path, and
the time-optimal path or the energy-optimal path adheres to the boundary conditions.

9. The control device of claim 1, wherein the optimization criterion specifies that a time taken to traverse the path is to be optimized or an amount of energy consumed to traverse the path is to be optimized.

10. The control device of claim 1, wherein the first parameters include an extent of eccentricity of an eccentric.

* * * * *